Figure 1:
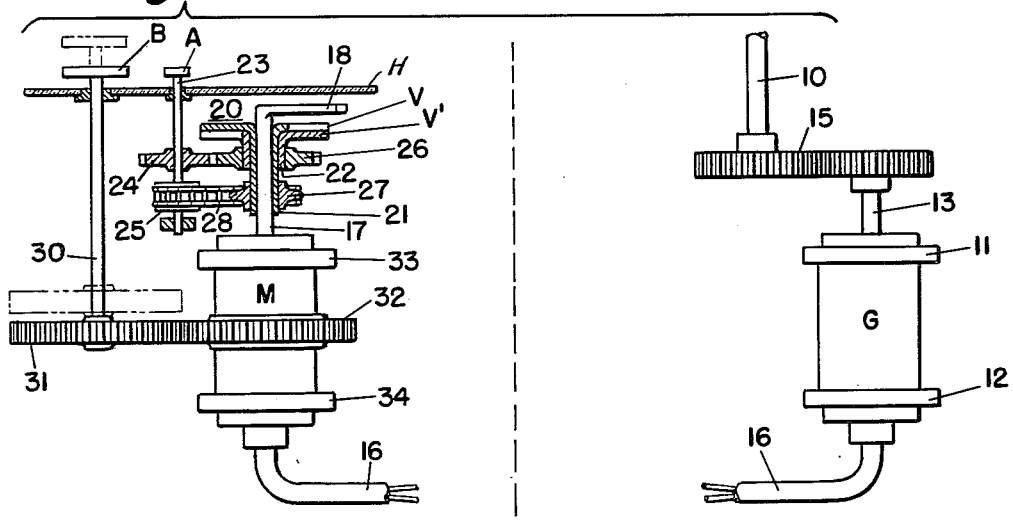

Aug. 21, 1962    R. E. FINCH    3,050,709
REMOTE CONTROL FOR ANGLE SETTING INDICATOR
Filed May 22, 1959

INVENTOR.
ROBERT E. FINCH
BY
*J. J. Sheehan*
ATTORNEY

United States Patent Office 3,050,709
Patented Aug. 21, 1962

3,050,709
REMOTE CONTROL FOR ANGLE SETTING INDICATOR
Robert E. Finch, 6308 Orchid Drive, Bethesda, Md.
Filed May 22, 1959, Ser. No. 815,235
2 Claims. (Cl. 340—26)
(Granted under Title 35, U.S. Code (1952), sec. 266)

The invention described herein may be manufactured and used by or for the Government of the United States of America for governmental purposes without the payment of any royalties thereon or therefor.

This invention relates to landing of aircraft on decks of airplane carriers and in particular is concerned with carriers using visual landing systems of the mirror deck landing or "Fresnel" lens landing type and involves an arrangement for indicating at a remote control zone whether components of the landing system are in the required positions relative to the ship deck in order to provide for the safe landing of aircraft.

Mirror deck landing systems are currently in use on aircraft carriers and comprise structure which is made up of elements including a large mirror arranged to be physically movable by an operator located on the deck of a carrier to adjust the mirror with respect to its angle relative to the deck and with respect to vertical distance above or below the deck. These adjustments vary to suit the characteristics of different types of aircraft and weather conditions and are made to provide the correct glide angle for the aircraft relative to the vessel deck and insure that a proper landing can be made. To this end, the mirror supporting or mounting structure of landing systems now in use is such as to permit the mirror to be angularly adjustable and adjustable in height and also provide for inclination of the mirror with reference to the horizon, which is accomplished by gyroscopic or other means in order to compensate for pitching movements of the ship in a seaway. In an aircraft carrier fitted with so-called "angle deck" i.e. one in which the runway is angled in relation to the centreline of the ship, it may be possible to site the mirror on or near the centreline of the ship where vertical movements of the mirror due to rolling will be negligible. In this position stabilization for roll as well as pitch can readily be achieved. In any event, the mirror settings are determined or calculated by and are under the control of an officer who is located remotely from the landing deck, and the angle and height settings to which the mirror is to be adjusted are transmitted by the officer to the operator on the landing deck who makes the actual adjustments to the landing system and particularly to the mirror.

This invention is concerned with an arrangement for indicating to the control officer in the remote area the actual physical adjustments which have been made to the mirror or mirror landing system in order that the officer or person in the remote zone can check the actual adjustments against a reference which is indicative of the required adjustments. For this purpose, a register is located in the remote zone or area and is provided with an indicator and a reference point. As the operator on deck makes the physical adjustments to the mirror or the mirror landing system, they are immediately transmitted back to the register through auxiliary equipment and the register will show the adjustments which have actually been made by the operator. Other equipment is provided in the remote area and is operative by the officer to reset the register and thereby check the accuracy of the actual adjustments. If some error has been made in the actual adjustments by the operator on deck, the resetting of the register by the officer in the remote area will show the inaccuracy which will indicate the fact of some improper adjustment to the mirror or other element of the visual landing system.

This invention relates directly to my companion application filed April 27, 1959, for Angle Setting Indicator and concerns a practical embodiment of the invention disclosed herein.

Referring to the drawings, FIG. 1 is a diagrammatic view showing the control elements for the register which are located on the vessel deck and in the remote zone.

Figure 2:
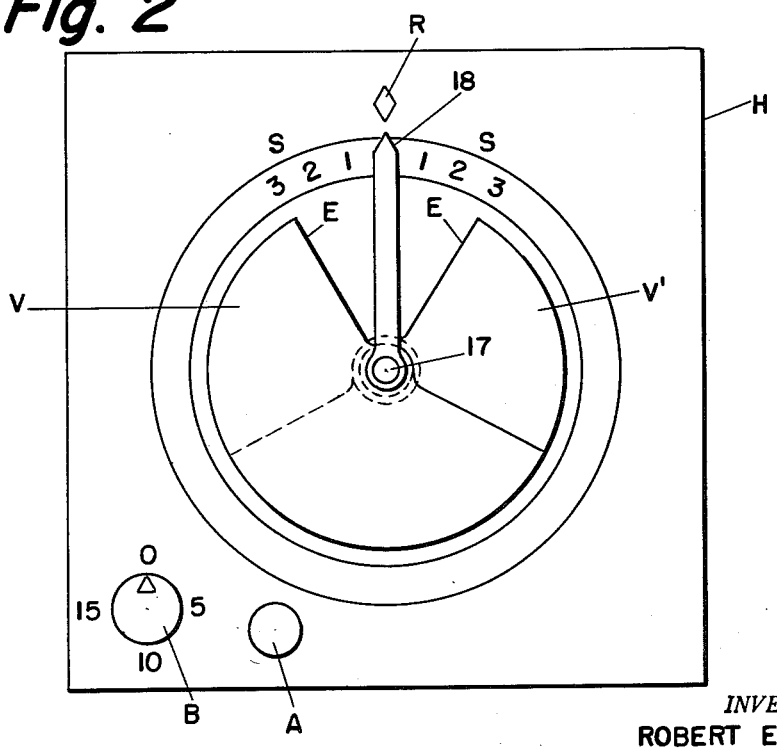

FIG. 2 is a plan view of a cabinet or housing for the control elements located in the remote zone.

Referring to FIG. 1, the drawing which is divided by the broken line shows generally at the left the control equipment and the register which are located in the remote zone, while to the right of the broken line is shown that portion of the register control equipment which is located on the deck of a carrier. The carrier, as explained generally heretofore, will have its landing deck (not shown) equipped with a mirror landing system and a support or post 10, as shown at the right side of FIG. 1, indicates a connection to the mirror landing structure and through which the mirror structure is adjusted. It is not considered necessary, for the purpose of explaining the invention, to show any details of the mirror landing structure, however, reference is made to Patent 2,784,925 to Goodhart, wherein such structure is shown on the deck of a vessel along with the mechanical arrangement for adjusting the mirror relative to the deck of the vessel.

The present invention involves the use of synchronized means for transmitting mirror adjustments to a register in the remote zone and manual means in the remote zone for checking the accuracy of the mirror adjustments, and also means associated with the register to show a range of safe operation under dynamic conditions of roll and pitch of the vessel.

As shown in FIG. 1, a generator G, located in the carrier deck zone, is mounted on suitable supports 11 and 12 and has a shaft indicated at 13 providing a means for connection through suitable gearing means 15 to post 10 which supports a mirror or lens (not shown). A motor M is located in the remote zone and is electrically connected with generator G through line 16 and the motor M has its shaft 17 connected with an indicator arm 18 of a registering mechanism which is shown generally at 20. When the mirror is adjusted from one position to another, the post 10 will be moved correspondingly and will transmit, through gearing means 15 and generator shaft 13, the mirror's adjusted position which will in turn be electrically transmitted to the motor M by generator G and the indicator 18 will be correspondingly actuated by the motor M.

The registering mechanism may be enclosed in a cabinet or housing having a transparent top portion indicated at H in FIGS. 1 and 2. As shown in FIG. 2, a reference or fixed point R is located on the housing or cabinet top H in cooperative relation with the indicator 18. A graduated or scaled section S is also provided on H in cooperative relation with the indicator 18 and sector vanes V—$V^1$ are rotatably mounted about shaft 17 on suitable concentrically arranged bearings 21—22.

As shown in FIG. 1, the bearing 21 may be formed integrally with the vane V while the bearing 22 may be formed integrally with the vane $V^1$. The vanes are arranged to be simultaneously actuated by a knob A which is supported at one end of a shaft 23 having at its other end a spur gear 24 and a sprocket wheel 25. A spur gear 26 is mounted on the bearing 22 and is in mesh with spur gear 24 while a second sprocket wheel 27 is mounted on bearing 21 and is connected to coact with sprocket 25 through chain 28. Rotation of shaft 23 will through the gear and sprocket assembly move the edges E—E of the vanes toward or away from each other to contract or expand the space therebetween depending on the direction of rotation of knob A.

A knob B is mounted at one end of a shaft 30 having a spur gear 31 at its other end and the motor M is provided with a spur gear 32 disposed therearound as shown in FIG. 1 which can be meshed with the spur gear 31 by manual operation of shaft 30. The motor M is arranged to be physically rotated when in mesh with gear 31 and to this end the motor is mounted or supported in bearings 33 and 34. In FIG. 1 the spur gear 31 is shown in non-operating position as indicated in dashed lines.

For the purpose of explaining the operation of the apparatus, assume the mirror to be disposed normal to the flight deck and at deck level and that the officer in the remote area has calculated, in accordance with type of aircraft to be landed on the deck, that the mirror is to be adjusted at an angle of 5° and to a height of 8' above the deck in order to provide the proper glide path for the particular aircraft which is to be landed. The operator on deck will first adjust the mirror for the intended 5° adjustment and through the shaft connecting means 10, the generator G and motor M, the indicator arm 18 will be deflected a corresponding angle with respect to the reference R on FIG. 2. In order to check the accuracy of the angle adjustment, the officer in the remote area may then, through the knob B, rotate the motor 5° through the spur gear 31 by manually moving it from the dashed line position to the position shown in full lines and connect it with motor spur gear 32. If the actual angle adjustment of the mirror made by the operator was correct, the indicator 18 will then return to coincidence with the reference R since it moves as a unit with the motor movement. Following this, the operator will then adjust the mirror the required 8' above the deck and through the generator G and motor M, the indicator 18 will be deflected in accordance with the actual height adjustment. The officer in the remote area will then rotate the motor M through manipulation of knob B and spur gear 31 a value corresponding to an 8' height adjustment. This value will be calculated and may be assumed to be 2° for the purpose of explaining this invention. If the actual height adjustment of the mirror is correct, the indicator 18 will come to rest in coincidence with reference R. In the event of an improper adjustment or setting of the mirror it will be necessary for the operator to readjust the mirror until both the angle and height adjustment is proper to provide the desired glide path.

In FIG. 2 the scaled portion S, shown adjacent the reference R, defines an arc through which the indicator 18 may permissively swing or vary, due to the roll and pitch of the carrier deck depending on weather conditions, from the reference R and still show proper setting of the mirror. For example, in calm weather the indicator would be permitted to swing through the small arc, between 1 and 1, while in heavy weather the pitch of the vessel would be greatest and the indicator could swing between the arc defined by 3 and 3 while for moderately calm weather the arc would be between 2 and 2. Consequently, depending on weather conditions the officer in the remote area may through the knob A and the gear and sprocket assembly operate the vanes V—V¹ to set the vanes so that their edges E define a suitable arc through which the indicator 18 may swing and which would indicate that the mirror was properly adjusted for those weather conditions.

By the above general described operations, it is apparent that after each adjustment is made by the operator on the deck of the carrier, it is immediately checked by the officer in the remote zone and if any one adjustment is not properly made it will be corrected before any subsequent adjustment is made to the mirror.

It will be apparent to those skilled in the art that various changes and modifications may be made to the present disclosure without departing from the spirit of the invention.

I claim:

1. In a system for landing aircraft on the flight deck of a carrier on which a visual means is located and which is moved by an operator on the flight deck through a sequence of adjustments, the improvement which comprises a register in an area remote from the visual means, said register comprising a fixed scale having indicia thereon and an indicator movable relative to the indicia on said scale, synchronous means including a generator responsive to movement of the visual means and a motor, said motor being located in the area remote from the visual means and having its operating shaft connected to said indicator, said synchronous means being effective to move the indicator from a reference indicia on the scale in accordance with each adjustment made by the operator to the visual means, means for rotating said motor, said means being inoperative when an adjustment is made to the visual means and manually operative after each adjustment to move the indicator a predetermined value to check the accuracy of each adjustment in order to be certain that the actual adjustments made to the visual means are those which provide the proper glide path for landing an aircraft on the flight deck.

2. A control system as in claim 1, further characterized by the motor shaft having inner and outer concentrically mounted bearings thereon, a first sector vane on the inner bearing and a second sector vane on the outer bearing, said sector vanes being disposed in a common plane and parallel with said scale, a shaft in the remote area having a first connection with the inner bearing and a second connection with the outer bearing, said first and second connections being manually operative to simultaneously move the vanes toward or away from the reference point to define an arc on the scale through which the indicator may move as an indication of safe operation under existing weather conditions.

References Cited in the file of this patent

UNITED STATES PATENTS

| | | |
|---|---|---|
| 1,042,440 | Hubbard | Oct. 29, 1912 |
| 2,321,699 | O'Brien | June 15, 1943 |
| 2,543,002 | Deloraine | Feb. 27, 1951 |
| 2,701,353 | Van Sickle | Feb. 1, 1955 |
| 2,784,925 | Goodhart | Mar. 12, 1957 |
| 2,805,410 | Colt | Sept. 3, 1957 |
| 2,863,142 | Meredith | Dec. 2, 1958 |
| 2,923,886 | Widmer | Feb. 2, 1960 |
| 2,941,498 | Teter | June 21, 1960 |
| 2,958,847 | Trufanoff | Nov. 1, 1960 |

FOREIGN PATENTS

| | | |
|---|---|---|
| 630,011 | Great Britain | Oct. 4, 1949 |